United States Patent
Dübal et al.

(10) Patent No.: US 6,704,086 B1
(45) Date of Patent: Mar. 9, 2004

(54) MONOSTABLE FERROELECTRIC ACTIVE-MATRIX DISPLAY

(75) Inventors: Hans-Rolf Dübal, Eltville (DE); Rainer Wingen, Hattersheim (DE); Toshiaki Nonaka, Kakegawa (JP)

(73) Assignee: Aventis Research & Technologies GmbH & Co. KG, Frankfurt am Main (DE)

(*) Notice: Subject to any disclaimer, the term of this patent is extended or adjusted under 35 U.S.C. 154(b) by 0 days.

(21) Appl. No.: 09/700,517

(22) PCT Filed: May 19, 1999

(86) PCT No.: PCT/EP99/03437

§ 371 (c)(1),
(2), (4) Date: Mar. 6, 2001

(87) PCT Pub. No.: WO99/60441

PCT Pub. Date: Nov. 25, 1999

(30) Foreign Application Priority Data

May 20, 1998 (DE) .......................... 198 22 830

(51) Int. Cl.$^7$ .............................. G02F 1/141
(52) U.S. Cl. ........................ 349/172; 349/191
(58) Field of Search ................. 349/171, 172, 349/173, 133, 134, 135, 191

(56) References Cited

U.S. PATENT DOCUMENTS

| | | | |
|---|---|---|---|
| 4,367,924 A | | 1/1983 | Clark et al. |
| 4,783,148 A | | 11/1988 | Tsuboyama et al. |
| 5,214,523 A | * | 5/1993 | Nito et al. .................. 349/173 |
| 5,495,351 A | * | 2/1996 | Shingaki et al. ............. 349/74 |
| 5,530,566 A | * | 6/1996 | Kumar ........................ 349/86 |
| 5,555,111 A | | 9/1996 | Clark et al. |
| 5,666,217 A | * | 9/1997 | Kaneko et al. ............. 349/122 |
| 5,719,653 A | * | 2/1998 | Minato et al. ............. 349/156 |
| 5,844,652 A | * | 12/1998 | Takatori .................... 349/139 |
| 6,040,889 A | * | 3/2000 | Takatori et al. ............ 349/174 |
| 6,344,889 B1 | * | 2/2002 | Hasegawa et al. .......... 349/129 |

FOREIGN PATENT DOCUMENTS

| | | |
|---|---|---|
| EP | 032.362 | 7/1981 |
| JP | 152654 | 6/1996 |
| WO | WO 97/12355 | 4/1997 |

* cited by examiner

*Primary Examiner*—Kenneth Parker
(74) *Attorney, Agent, or Firm*—Frommer Lawrence & Haug LLP

(57) ABSTRACT

The monostable ferroelectric active matrix display contains a liquid crystal layer in from of a monodomain with an unambiguously defined direction of the normal z to the layer of the smC* phase and is characterized by the fact that the normal z to the layer and the preferential direction n of the nematic or cholesteric phase (N* phase) form an angle of more than 5°.

5 Claims, 4 Drawing Sheets

Sony-Mode[*]

Figure 1:
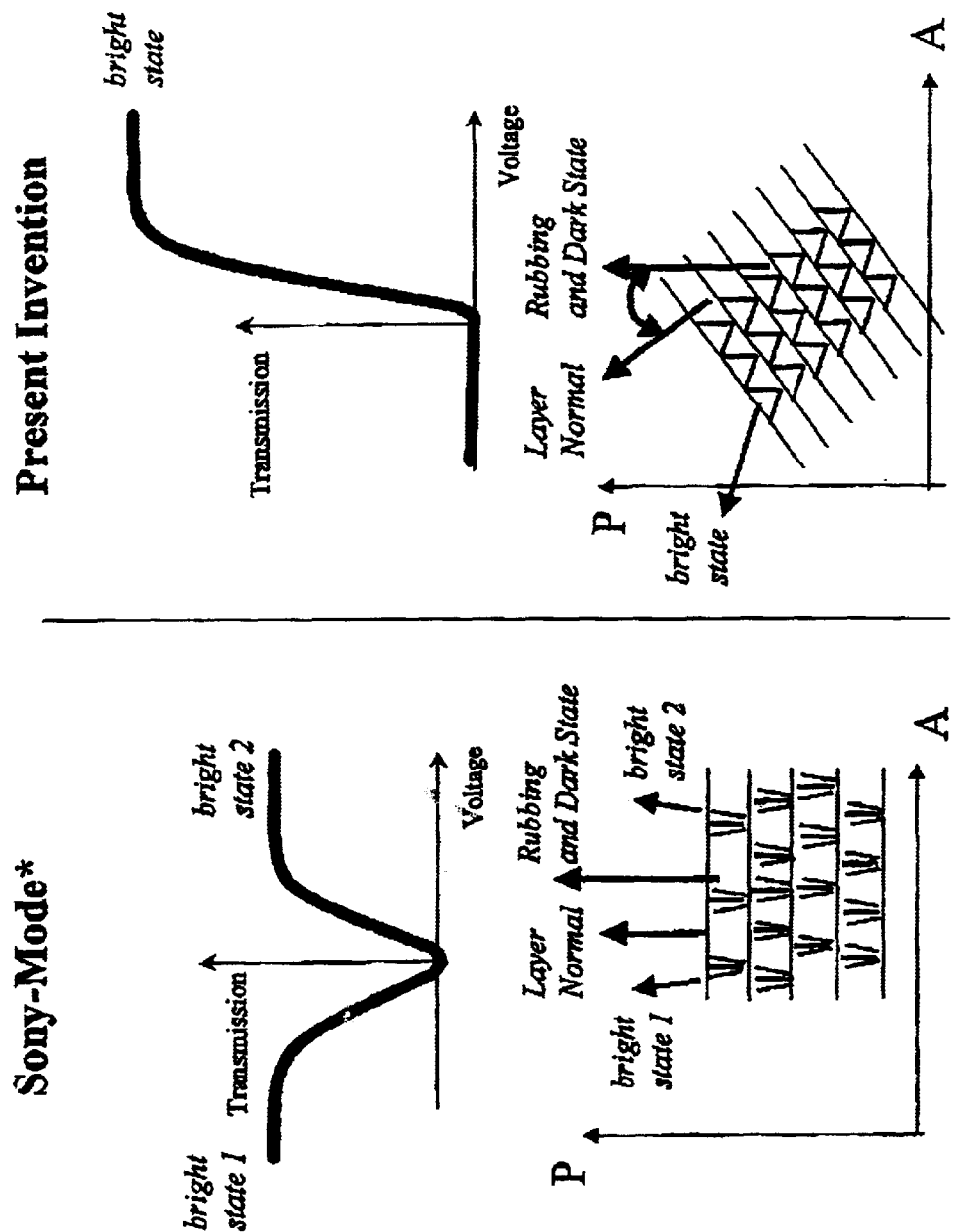
Figure 3:
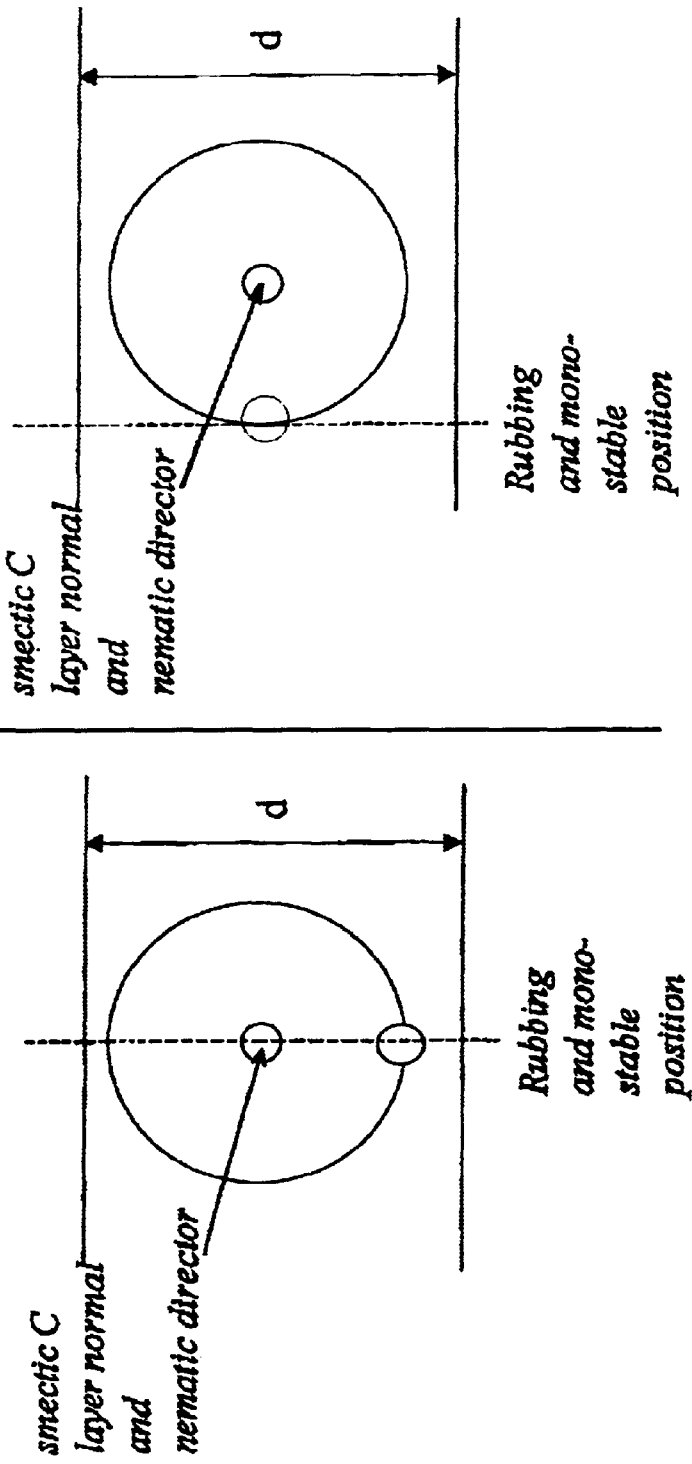
Figure 4:
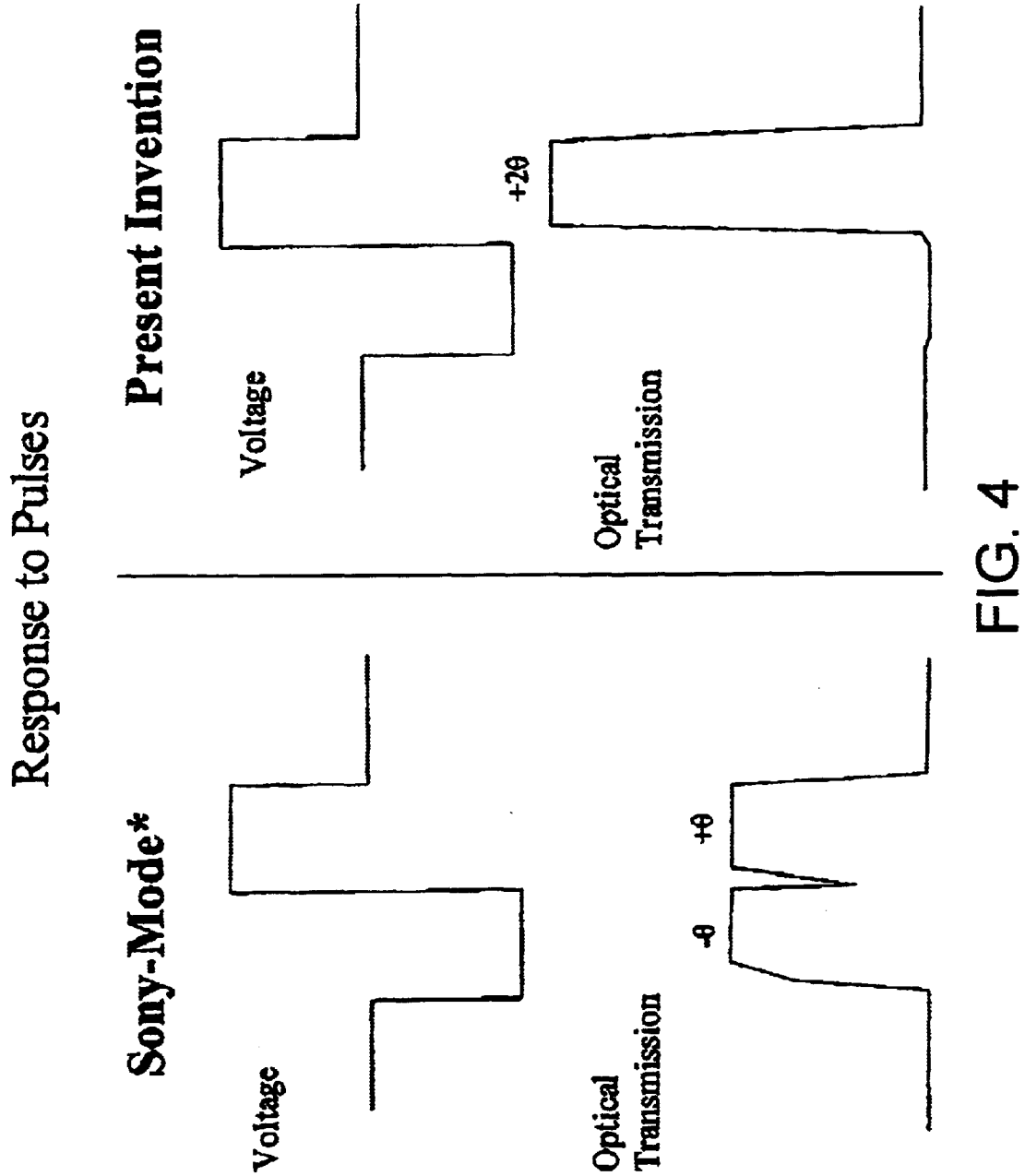

1) Phase sequence:
I N A C

2) Maximum transmission:
$I = I_0 * \sin^2(2\theta)$

3) Symmetric to polarity change 4) layer angle = tilt angle 5) monostable position parallel to layer normal (projection on glass plate)

6) angle between N-phase director and smectic layer normal is essentially Zero.

[*] Nito, K.,

Present Invention

Phase sequence:
I N C

Maximum transmission:
$I = I_0 * \sin^2(4\theta)$

Asymmetric to polarity change independent on tilt angle monostable position at ca. $\theta$ to layer normal (projection on glass plate)

6) angle between N-phase director and smectic layer normal is approximately $\theta$.

FIG. 2

MONOSTABLE FERROELECTRIC ACTIVE-MATRIX DISPLAY

Replacing the cathode ray tube (picture tube) by a flat screen requires a display technology which simultaneously makes it possible to achieve a high picture resolution, i.e. more than 1000 lines, a high picture brightness (>200 Cd/m$^2$), a high contrast (>100:1), a high frame frequency (>60 Hz), an adequate color representation (>16 million colors), a large picture format (>40 cm screen diagonal), a low power consumption and a wide viewing angle and, moreover, can be produced cost-effectively. Until now, there has been no technology which fully satisfies all these features simultaneously.

Many manufacturers have developed screens which are based on nematic liquid crystals and have been used in recent years in the field of notebook PCs, personal digital assistants and desktop monitors. Use is made here of the technologies STN (Supertwisted Nematics), AM-TN (Active Matrix—Twisted Nematics), AM-IPS (Active Matrix—In Plane Switching), AM-MVA (Active Matrix—Multidomain Vertically Aligned), which are extensively described in the literature, see e.g. T. Tsukuda, TFT/LCD: Liquid Crystal Displays Addressed by Thin-Film Transistors, Gordon and Breach 1996, ISBN 2-919875-01-9 and the literature cited therein; SID Symposium 1997, ISSN-0097-966X, pages 7 to 10, 15 to 18, 47 to 51, 213 to 216, 383 to 386, 397 to 404, and the literature cited therein. Furthermore, use is made of the technologies PDP (Plasma Display Panel), PALC (Plasma Addressed Liquid Crystal), ELD (Electro Luminescent Display) and FED (Field Emission Display), which are likewise explained in the SID report cited above.

Clark and Lagerwall (U.S. Pat. No. 4,367,924) have been able to show that the use of ferroelectric liquid crystals (FLCs) in very thin cells results in opto-electrical switching or display elements which have switching times which are faster by a factor of up to 1000 compared with conventional TN ("twisted nematic") cells, also see EP-A 0 032 362. On the basis of this and other favorable properties, e.g. the possibility of bistable switching and the fact that the contrast is virtually independent of the viewing angle, FLCs are fundamentally suitable for areas of application such as computer displays and television sets, as shown by a monitor marketed in Japan by Canon since May 1995.

The use of FLCs in electro-optical or fully optical components requires either compounds which form smectic phases and are themselves optically active, or the induction of ferroelectric smectic phases by doping compounds which, although forming such smectic phases, are not themselves optically active, with optically active compounds. In this case, the desired phase should be stable over the broadest possible temperature range.

The individual pixels of an LC display are usually arranged in an x-y matrix formed by the arrangement of a respective series of electrodes (conductor tracks) along the rows and columns on the lower or upper side of the display. The points of intersection of the horizontal (row) and vertical (column) electrodes form addressable pixels.

This arrangement of the pixels is usually referred to as a passive matrix. For addressing, various multiplex schemes have been developed, as described for example in Displays 1993, vol. 14, No. 2, pp 86–93 and Kontakte 1993 (2), pp. 3–14. Passive matrix addressing has the advantage of simpler production of the display and associated low production costs, but the disadvantage that passive addressing can only ever be effected line by line, which results in the addressing time for the entire screen with N lines being N times the line addressing time. For customary line addressing times of approximately 50 microseconds, this means a screen addressing time of approximately 60 milliseconds in e.g. the HDTV standard (High Definition TV, 1152 lines), i.e. a maximum frame frequency of approximately 16 Hz. The latter frequency is too low for the representation of moving images. In addition, the representation of gray shades is difficult. On the occasion of the FLC Conference in Brest, France (Jul. 20–24, 1997, see Abstract Book 6th International Conference on Ferroelectric Liquid Crystals, Brest/France), Mizutani et al. presented a passive FLC display with digital gray shades in which each of the RGB pixels (RGB=red, green, blue) was subdivided into sub-pixels, thereby allowing the representation of gray shades in digital form by means of partial switching. With N gray shades using three primary colors (red, green, blue), $3^N$ colors are produced. The disadvantage of this method is the considerable increase in the number of required screen drivers and thus in the costs. In the case of a screen shown at Brest, three times as many drivers were required as in the case of a normal FLC display without digital gray shades.

In so-called active matrix technology (AMLCD), a non structured substrate is usually combined with an active matrix substrate. An electrically non linear, element, for example a thin-film transistor, is integrated into each pixel of the active matrix substrate. The non linear element may also be diodes, metal-insulator-metal and similar elements, which are advantageously produced by thin-film processes and are described in the relevant literature, see e.g. T. Tsukuda, TFT/LCD: Liquid Crystal Displays Addressed by Thin-Film Transistors, Gordon and Breach 1996, ISBN 2-919875-01-9, and the literature cited therein. Active matrix LCDs are usually operated with nematic liquid crystals in TN (twisted nematics), ECB (electrically controlled birefringence), VA (vertically aligned) or IPS (in plane switching) mode. In each case, the active matrix generates an electric field of individual strength on each pixel, producing a change in orientation and thus a change in birefringence, which is in turn visible in polarized light. A severe disadvantage of these processes is the poor video capability caused by the excessively long switching times of nematic liquid crystals.

For this and other reasons, liquid crystal displays based on a combination of ferroelectric liquid crystal materials and active matrix elements have been proposed, see e.g. WO 97/12355 or Ferroelectrics 1996, 179, 141–152, W.J.A.M. Hartmann, IEEE Trans. Electron. Devices 1989, 36, (9; Pt. 1), 1895–9, and Dissertation Eindhoven, the Netherlands 1990.

Hartmann utilized a combination of the so-called "quasi-bookshelf geometry" (QBG) of FLC and a TFT (Thin-Film Transistor) active matrix and simultaneously achieved a high switching speed, gray shades and high transmission. However, the QBG is not stable over a wide temperature range, since the temperature dependence of the smectic layer thickness disrupts or rotates the field-induced layer structure. Furthermore, Hartmann utilizes an FLC material having a spontaneous polarization of more than 20 nC/cm$^2$, which, in the case of pixels having realistic dimensions of e.g. 0.01 mm$^2$ area, results in large electric charges (at saturation, Q=2 A P, A=pixel area, P=spontaneous polarization) which, e.g. using amorphous silicon TFTs that can be produced cost-effectively, cannot reach the pixel during the opening time of the TFT. For these reasons, this technology has not been further pursued hitherto.

While Hartmann utilizes the charge-controlled bistability to display a virtually continuous gray scale, Nito et al. have proposed a monostable FLC geometry, see Journal of the SID, 1/2, 1993, pages 163–169, in which the FLC material is oriented with the aid of comparatively high voltages in such a way that only one stable position results, from which a number of intermediate states are then generated by application of an electric field via a thin-film transistor. These intermediate states correspond to a number of different brightness levels (gray shades) when the cell geometry is matched between crossed polarizers.

One disadvantage of this procedure, however, is the occurrence of a streaky texture in the display, which limits the contrast and brightness of this cell (see FIG. 8 in the abovementioned citation). Although the disadvantageous streaky texture can be corrected by treatment with a high electric voltage (20–50 V) in the nematic or cholesteric phase (see p. 168 of the abovementioned citation), such field treatment is not suitable for mass production of screens and, also, generally does not result in temperature-stable textures. Furthermore, this method produces switching only in an angle range of up to a maximum of once the tilt angle, which is approximately 22° in the case of the material used by Nito et al. (see p. 165, FIG. 6) and thus produces a maximum transmission of only 50% of the transmission of two parallel polarizers.

The object of the present invention is to provide a ferroelectric active matrix liquid crystal display containing a ferroelectric liquid crystal mixture, where the liquid crystal mixture assumes a monostable position, but without thereby forming a streaky texture, is temperature-stable and makes it possible to achieve a very high maximum transmission and also a very high contrast.

The object is achieved according to the invention by means of a monostable ferroelectric active matrix display, containing a liquid crystal layer in the form of a monodomain with an unambiguously defined direction of the normal z to the layer of the smC* phase, where the normal z to the layer and the preferential direction n of the nematic or cholesteric phase (N* phase) form an angle of more than 50°.

The active matrix FLCD according to the invention contains, as the optically active layer, a ferroelectrically liquid-crystalline medium (liquid crystal phase) with a phase sequence of isotropic–nematic or cholesteric (N*)–smectic C* or a phase sequence of isotropic–nematic or cholesteric (N*)–smectic A*–smectic C*, where the smectic A* phase has a range of existence (phase range) of at most 2° C., preferably at most 1° C., particularly preferably at most 0.5° C.

The asterisk (*) on the phase designation indicates that a chiral phase is involved.

The displays are produced preferably according to a process in which the liquid crystal layer is introduced into the interspace between a rubbed upper substrate plate and a rubbed lower substrate plate of the active matrix display, the rubbing directions on the upper and lower substrate plates being essentially parallel, and the liquid crystal phase is cooled from the isotropic phase, an electric DC voltage being applied to the display at least during the N*->smC* or N*->smA*->smC* phase transition.

The FLC mixture is filled into an active matrix display. The production and the components of such an AM display are extensively described in the Tsukuda literature cited above. Unlike in nematic displays, however, the thickness of the FLC layer is only from 0.7 to 2.5, preferably 1–2 μm. Furthermore, the rubbing directions on the upper and lower substrate plates are essentially parallel. The term "essentially parallel" includes antiparallel rubbing directions, or rubbing directions that are crossed, slightly, i.e. up to 10°.

What is important for the functioning of this display, then, is that during the production of the display, during controlled cooling, an electric DC voltage, preferably of less than 5 V, is applied and is maintained during the N*->smC* or N*->smA*->smC* phase transition, this causing the entire display to assume a monostable monodomain which appears completely dark between crossed polarizers.

Once this domain has been obtained, the DC voltage is switched off. The texture thus obtained is monostable, in contrast to Hartmann's approach cited above or in contrast to conventional bistable FLCDs. This means that the preferred n-director, (which indicates the preferential direction of the longitudinal molecular axes) is in the rubbing direction of the cell, whereas the z-director (which indicates the preferential direction of the smectic normal to the layer) is inclined relative to the rubbing direction approximately by the amount of the tilt angle. This configuration is exactly the opposite of the usual bistable cell according to Clark and Lagerwall, in which the z-director is in the rubbing direction.

In contrast to Nito's approach, in the case of this orientation there are precisely no two normals to the layer and thus no two orientation domains which ultimately result in the abovementioned disturbing streaky texture, but rather only one unambiguous direction of the z-director and therefore one monodomain. Furthermore, twice the tilt angle, which results in 100% transmission with reference to parallel polarizers, is now available, i.e. double the brightness is attained.

The display thus obtained appears completely dark at a suitable angle of rotation between crossed polarizers. It appears bright when a drive voltage of just a few volts is applied, the brightness being continuously variable by way of the voltage and, at saturation, having virtually the brightness of two parallel polarization sheets. An important feature of this display is that the angle between the preferential direction of the nematic (or cholesteric) phase and the normal to the layer (z-director), is ideally equal to the tilt angle of the smectic C phase, or is at least essentially equal to the tilt angle. "Essentially" in the sense of this invention preferably means a range of values of from half through to the full tilt angle, particularly preferably from 0.8 to 1 times the tilt angle, but at least of 5°.

The ferroelectric active matrix liquid crystal display according to the invention has high practicability, in particular for TV and HDTV or multimedia, since it combines high transmission, short switching time, gray scale and therefore full color capability, cost-effective production and wide temperature range. Furthermore, the display can be operated at voltages of $\leq 10$ volts, preferably $\leq 8$ V, particularly preferably $\leq 5$ V.

The spontaneous polarization of the active matrix FLCD according to the invention is preferably less than 15 nC/cm$^2$, preferably in the range of from 0.01 to 10 nC/cm$^2$ at the operating temperature of the display.

Preferably, in the liquid crystal layer, the length of the chiral-nematic or cholesteric pitch in a temperature range of at least 2° C. above the transition to the smectic phase is more than 50 μm.

In particular, active matrix display in the sense of the present invention is also understood to mean an LCD in which one of the two substrates is replaced by the rear side of an IC chip (IC=integrated circuit), as described for example by D. M. Walba, Science 270, 250–251 (1995).

The displays may be used for example in the TV, HDTV or multimedia field or in the field of information processing, e.g. in notebook PCs, personal digital assistants or desktop monitors.

The examples below are intended to illustrate the invention in more detail.

EXAMPLES

Example 1

An FLC mixture having the following composition is prepared:

| | |
|---|---|
| 4-(5-dodecylpyrimidine-2-yl)phenyl-4-(trans-pentylcyclohexane)carboxilic acid ester | 27% by weight |
| 2-(4-hexyloxyphenyl)-5-octylpyrimidine | 19.7% by weight |
| 2-(4-decyloxyphenyl)-5-octylpyrimidine | 25.6% by weight |
| (S)-2-fluorodecyl-[4-(5-decylpyrimidine-2-yl)phenyl]ether | 3% by weight. |

The phase sequence is:

isotropic 83.1° C. cholesteric 57.7° C. smectic A* 57.6° C. smectic C*.

The tilt angle is 25° at 30° C. The spontaneous polarization is 2 nC/cm².

Example 2

A glass substrate coated with transparent-conductive indium tin oxide is patterned 2 in a photolithographic process to give an electrode pattern. The transparent conductor tracks of this electrode structure are used for electrically driving the display by means of a function generator and the switching behavior of a thin-film transistor is thus simulated. Two glass plates patterned in this way, which form the upper and lower sides of the display—that is to say the supporting plates—, are joined together with the aid of an adhesive frame. The layer thickness is 1.3 μm. The adhesive is cured by careful heating, the liquid crystal mixture from example 1 is filled in at 100° C. and the cell is brought to a temperature of 60° by slow cooling. At this temperature, a DC voltage of 4 V is applied and the cooling process is then continued down to 22° C. The DC voltage is switched off. A monostable monodomain is obtained which appears fully dark between crossed polarizers.

The cell is then connected up to square-wave pulses of variable amplitude and the transmission is measured by means of a photodiode and an oscilloscope. The following transmission values are obtained:

| Voltage in volts | Transmission = photodiode signal in millivolts |
|---|---|
| 0 | 1 |
| 2 | 24 |
| 3 | 79 |
| 4 | 129 |
| 5 | 190 |

After having being connected up, the cell returns to the dark state (0% transmission) once more.

The table below shows the switching time and relaxation time of maximum brightness into the zero state as a function of the applied square-wave voltage:

| Voltage in volts | Switching time in milliseconds | Relaxation time in milliseconds |
|---|---|---|
| 2 | 2.3 | 0.34 |
| 3 | 1.9 | 0.33 |
| 4 | 1.7 | 0.31 |
| 5 | 1.1 | 0.29 |

All values relate to a temperature of 22° C.

Example 3

| | |
|---|---|
| 2-(4-hexyloxyphenyl)-5-octylpyrimidine | 18.9% by weight |
| 2-(4-decyloxyphenyl)-5-octylpyrimidine | 24.5% by weight |
| 2-(4-octyloxyphenyl)-5-octylpyrimidine | 23.6% by weight |
| 2-(2,3-difluoro-4'-pentyl-biphenyl-4-yl)-5-nonyl-pyrimidine | 30.0% by weight |
| (S)-2-fluorodecyl-[4-(5-decylpyrimidine-2-yl)phenyl]ether | 3% by weight. |

The phase sequence is:

isotropic 80° C. cholesteric 60° C. smectic C*.

The spontaneous polarization is 1.7 nC/cm².

Example 4

A glass substrate coated with transparent-conductive indium tin oxide is patterned in a photolithographic process to give an electrode pattern. The transparent conductor tracks of this electrode structure are used for electrically driving the display by means of a function generator and the switching behavior of a thin-film transistor is thus simulated. Two glass plates patterned in this way, which form the upper and lower sides of the display—that is to say the supporting plates—, are joined together with the aid of an adhesive frame. The layer thickness is 1.3 μm. The adhesive is cured by careful heating, the liquid crystal mixture from example 3 is filled in at 100° C. and the cell is brought to a temperature of 63° C. by slow cooling. At this temperature, a DC voltage of 4 V is applied and the cooling process is then continued down to 22° C. The DC voltage is switched off. A monostable monodomain is obtained which appears fully dark between crossed polarizers.

The cell is then connected up to square-wave pulses of variable amplitude and the transmission is measured by means of a photodiode and an oscilloscope. The following transmission values are obtained:

| Voltage in volts | Transmission = photodiode signal in millivolts |
|---|---|
| 0 | 1 |
| 2 | 108 |
| 3 | 217 |
| 4 | 306 |
| 5 | 392 |

After having being connected up, the cell returns to the dark state (0% transmission) once more.

The table below shows the switching time and relaxation time of maximum brightness into the zero state as a function of the applied square-wave voltage:

| Voltage in volts | Switching time in milliseconds | Relaxation time in milliseconds |
|---|---|---|
| 2 | 1.9 | 0.33 |
| 3 | 1.6 | 0.29 |
| 4 | 1.4 | 0.25 |
| 5 | 0.94 | 0.24 |

All values relate to a temperature of 22° C.

What is claimed is:

1. A monostable ferroelectric active matrix display, containing a liquid crystal layer in the form of a monodomain with a defined direction of the normal z to the layer of the smC* phase, wherein the normal z to the layer and the preferential direction n of the nematic or cholesteric phase (N* phase) form an angle of more than 5° and wherein the ferroelectric liquid crystal layer has a phase sequence of l*–N*–smC* where there may be an smA* phase having a range of existence of at most 2° C. between the N* phase and the smC* phase.

2. The active matrix display as claimed in claim 1 wherein the angle between the normal z to the layer of the smC* phase and the preferential direction n of the nematic or cholesteric phase (N* phase) lies in a range of from 0.5 times to 1.0 times the smC* tilt angle.

3. The active matrix display as claimed in claim 1, wherein the spontaneous polarization of the ferroelectric liquid crystal phase is less the 15 $nC/cm^2$.

4. The active matrix display as claimed in claim 1, wherein, in the liquid crystal layer, the length of the chiral-nematic or cholesteric pitch in a temperature range of at least 2° C. above the transition to the smectic phase is more than 50 $\mu$m.

5. A process for producing active matrix displays as claimed in claim 1 in which the liquid crystal layer is introduced into the interspace between a rubbed upper substrate plate and a rubbed lower substrate plate of the active matrix display, the rubbing directions on the upper and lower substrate plates being essentially parallel, and the liquid crystal phase is cooled from the isotropic phase, an electric DC voltage being applied to the display at least during the N*->smC* or N*->smA*->smC* phase transition.

* * * * *